May 21, 1940.   W. L. WESTLUND   2,201,657
TURN SIGNAL FOR AUTOMOBILES
Filed Jan. 3, 1938
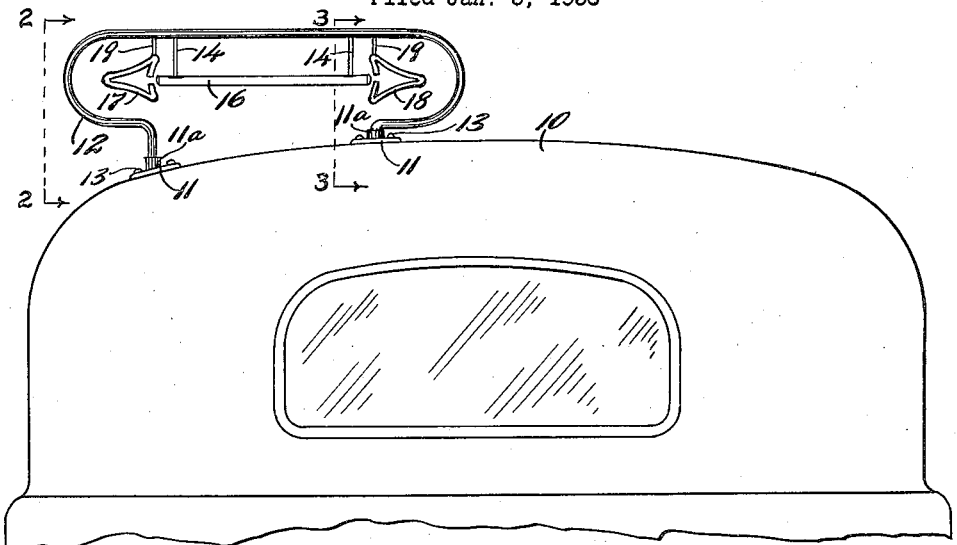
Fig.1
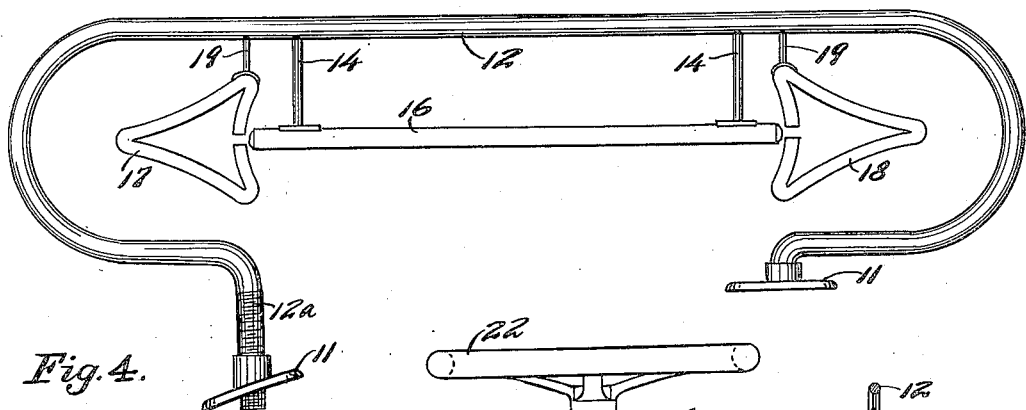
Fig.4.
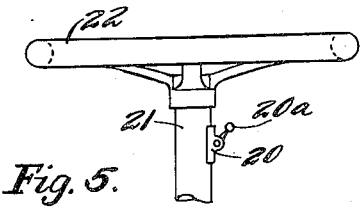
Fig.5.
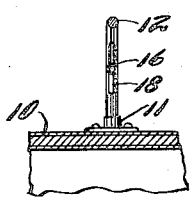
Fig.3.
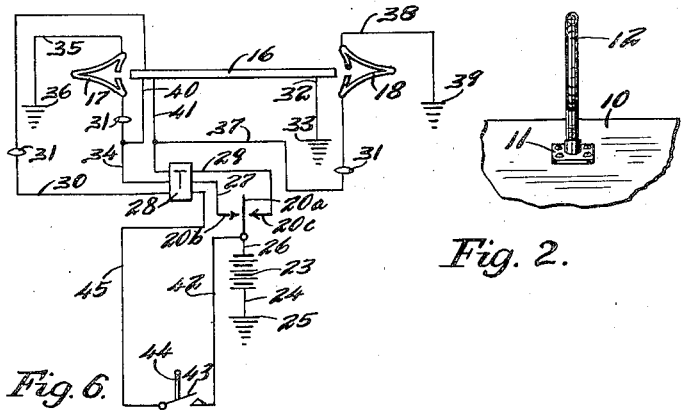
Fig.2.
Fig.6.
Inventor
WALTER L. WESTLUND
By Chas. C. Reif.
Attorney Patented May 21, 1940

2,201,657

UNITED STATES PATENT OFFICE 2,201,657

TURN SIGNAL FOR AUTOMOBILES

Walter L. Westlund, St. Paul, Minn.

Application January 3, 1938, Serial No. 182,950

1 Claim. (Cl. 177—329)

This invention relates to a turn signal for vehicles such as automobiles. In view of modern traffic conditions it is very desirable and in some places it is compulsory to give a signal when a turn is to be made to the right or to the left. A turn signal to be most efficient must be disposed where it can be seen from the front or rear of the vehicle. It should also be located where it will be least obscured by other vehicles.

It is an object of this invention to provide a simple and conspicuous turn signal disposed on the top of the automobile so that it can be seen from the front or rear thereof.

It is a further object of the invention to provide a turn signal of the illuminated type and one comprising members made of tubes containing gas and electrodes and adapted to be illuminated as are the well known neon signs.

It is more specifically an object of the invention to provide a conspicuous turn signal mounted on top of the automobile comprising three separate members adapted to be cooperatively illuminated, a guard preferably being provided over said signal.

These and other objects and advantages of the invention will be fully set forth in the following description made in connection with the accompanying drawing in which like reference characters refer to similar parts throughout the several views and in which:

Fig. 1 is a view in rear elevation of the upper part of an automobile showing the signals mounted thereon;

Fig. 2 is a view in side elevation as indicated by the line 2—2 of Fig. 1 and the arrows adjacent thereto;

Fig. 3 is a vertical section taken substantially on line 3—3 of Fig. 1 as indicated by the arrows;

Fig. 4 is a view in rear elevation of the signal device shown upon an enlarged scale;

Fig. 5 is a partial view of the steering post and steering wheel showing the switch thereon; and Fig. 6 is a wiring diagram for the signals.

Referring to the drawing, in Fig. 1 the upper part of an automobile 10 is shown, the same being viewed from the rear and being of the closed car type. Said top has mounted thereon in spaced relation small flanged brackets 11 having upstanding tubular portions 11a. A guard member 12 in the form of a cylindrical rod has its ends disposed vertically and secured in the hubs 11a. As shown in Fig. 4 one of the ends of rod 12 is threaded as shown at 12a and engages threads in its bracket 11. Said end is thus arranged so that it can be moved more or less into its bracket 11. The brackets 11 will be secured to the top of the automobile by suitable screws or rivets 13. A short distance above brackets 11 the rod 12 is bent at a right angle so as to extend toward the remote sides of said brackets. Said rod is then bent into semi-circular form at each end and has a top horizontal portion. Rod 12 will preferably be hollow or in the form of a tube. Small tubular supports 14 are secured to the underside of member 12 and support at their lower ends a tube 16 of elongated form. Tube 16 will be made of glass or other transparent material and will have an electrode therein so that it can be illuminated as is the tubular and well known neon sign. Members 17 and 18 are disposed adjacent the ends of tube 16 but separated slightly therefrom and are axially aligned with said tube. Members 17 and 18 are shown as in the form of arrows or arrowheads and they point respectively away from the ends of tube 16. The members 17 and 18 will also be made of transparent tubes and will contain electrodes so that they may be illuminated as are the common neon signs. Members 17 and 18 are supported by small tubular supports 19 secured thereto and depending from member 12. The conductors for member 16 will pass through the tubular supports 14 and through the member 12 into the top of the automobile. The conductors for members 17 and 18 will pass through the tubular supports 19 respectively and through member 12 into the top of the automobile. There is now on the market a transformer device which can be used with the ordinary automobile battery to furnish suitable current for illuminating the tubular members 16, 17 and 18. A switch 20 having a small operating lever 20a will be provided for controlling the circuits for members 16, 17 and 18 and this switch will preferably be located on the steering post 21 a short distance under the steering wheel 22 secured to said post.

The wiring diagram for the device is shown in Fig. 6. The battery of the automobile is illustrated as 23 and as usual will be connected by conductor 24 to ground 25 or as is the usual practice to the frame of the automobile. Battery 23 will be connected by a conductor 26 to the movable contact or member 20a of the switch 20. The stationary contacts are shown as 20b and 20c disposed at either side of a spaced frame contact 20a. Contact 20b is connected by a conductor 27 to the transformer 28 already referred to. Contact 20c is connected by a conductor 29 to the transformer 28, said transformer being designated by the letter T. A conductor 30 extends from one opposite contact of transformer 28 to one part of the electrode in tube 16. A flasher device 31 is inserted in the conductor 30. Such flasher devices are now common in the art and the structure thereof need be no further described. The device merely acts to interrupt the current at short intervals to give a flashing effect on a member illuminated by the current passing therethrough. A conductor 32 extends from the other part of the electrode in tube 16 to the ground or frame as indicated at 33. A conductor 34 extends one opposite contact of transformer 28 to one part of the electrode in one end of member 17, said conductor also having a flasher 31 inserted therein. A conductor 35 extends from the other part of the electrode in member 17 to ground at 36 or to the frame of the automobile. A conductor 37 extends from another opposite contact on transformer 28 to one part of the electrode in one end of member 18, said conductor also having a flasher 31 inserted therein. A conductor 38 extends from the other part of the electrode in the other end of member 18 to ground or the frame of the machine as indicated at 39. A conductor 40 extends from conductor 34 to the first mentioned part of the electrode in one end of member 16, and a conductor 41 extends from conductor 37 to one part of said electrode in member 16.

It will be understood that switch member 20a will have three positions, an open or central position and closed positions at either side of said central or open position. When switch contact 20a is moved into engagement with contact 20c a circuit will be closed from battery 23 through conductor 26 contacts 20a and 20c, conductor 29, through transformer 28, through conductors 37 and 41 to one end of tube 16 and to ground through conductor 32. The current thus traverses tube 16 and tube 16 is thus illuminated. A circuit is also completed as above traced through transformer 28 then through conductor 37 and flasher 31 to one part of the electrode in member 18 and through said member 18 and the other part of the electrode therein, then through conductor 38 to ground 39. Member 18 will thus be illuminated simultaneously with member 16 and member 18 will flicker or be intermittently illuminated by the action of flasher 31. The tube 16 and member 18 are thus illuminated and will indicate to traffic both in the rear of the automobile and in the front thereof that the driver contemplates a right turn. When the contact 20a is moved into engagement with contact 20b a circuit is closed from battery 23 through conductor 26, through contacts 20a and 20b, conductor 27 and through transformer 28 then through conductor 34 and flasher 31 to member 17 and from the other end of member 17 through conductor 35 to ground 36. Member 17 will be illuminated and will flicker due to flasher 31. A circuit is also completed from conductor 34 through conductor 40 to one part of an electrode in one end of tube 16 through said tube to the other part of the electrode therein then into conductor 32 to ground 33. Member 16 will thus be illuminated simultaneously with member 17. Members 16 and 17 being illuminated and member 17 flashing a very conspicuous signal will be given, visible from the front and rear of the automobile indicating that the driver is contemplating a left turn. In practice member 16 will be constructed and arranged to be of red color when illuminated, member 17 will also be constructed and arranged to be of red color and member 18 will be constructed and arranged to be of a green color. These colors are now in common use in such illuminated gas type signs. It will thus be seen that the turn signals are constituted by the illuminated red member 16 and the pointed member acting in conjunction therewith at the end thereof toward which the turn is to be made.

It is also desired to use the member 16 as a stop signal and for this purpose a conductor 42 is provided leading from conductor 26 to a switch 43 of the single pole type which will be connected by a member 44 to the brake lever of the automobile so that switch 43 will be closed when the brakes are to be applied. A conductor 45 extends from switch 43 to one entering contact of transformer 28 and the opposite contact is connected to conductor 30. It will be seen that when switch 43 is closed that a circuit will be closed through member 16 which will extend from battery 23 through conductors 26 and 42 through switch 43 and conductor 45, through transformer 28 and through conductor 30 to the part of the electrode in one end of tube 16 and then through conductor 32 to ground 33. Member 16 will thus be illuminated and the same flicker due to the operation of the flasher 31. Member 16 will thus be illuminated and act as a stop light to indicate when the automobile is coming to a stop. The connections of course, must be so arranged that current cannot feed back through conductors 40 or 41 to illuminate members 17 or 18. The switch 20 will be made of any convenient and simple type and the two contact sides thereof may be provided with red and green colors or they may be also entitled with the letters R and L to indicate in which positions the switch will be disposed to indicate a right or left turn. The threaded portion 12a on member 12 is provided so that adjustment can be made for different styles or makes of cars where there may be a difference in the slope of the car top or roof.

From the above description it is thus seen that applicant has provided a very simple and yet very efficient turn signal. The signal being disposed on the top of the car is in the most conspicuous place and can be seen at long distances. Being illuminated it is also very conspicuous. The member 12 is provided to act as a guard or shield for the members 16, 17 and 18. Should the car be out in a snow storm the guard 12 will prevent the snow falling directly on top of the members 16, 17 and 18 and there will be a tendency for the snow to be swept out of the loop formed by guard 12 so that the device will be kept clear of snow. The signal will thus not be obscured by the snow piling up on members 16, 17 and 18. The member 12 also forms a convenient support and guard for the glass or transparent portions 16, 17 and 18 preventing them from being struck from any object from above. There may be a certain amount of resiliency in member 12 due to the bends at the ends thereof which will tend to absorb any shock which might be transmitted to the roof of the car. If desired, the brackets 11 may be made resilient or may be mounted on resilient members.

It will be apparent that the device will have a high degree of utility for the purpose intended.

It will be understood that the members 16, 17 and 18 will contain neon or other suitable gas and the electrodes as is the common practice and well known in the art. The member 12 will be nicely plated and chromium plating preferably being used. This will make the surface quite smooth so that snow, dust or dirt will not easily adhere thereto. The plating will also have quite a reflecting effect which will add to the efficiency of the signal. The bright plating will also keep the device from becoming unduly heated in the sun. The interior of the device forming members 16, 17 and 18 may be frosted in some suitable manner and add to the visibility in the daytime. It will also be noted that the device being at the left hand side of the car will be more easily seen by traffic following the car. By moving slightly to the left in the traffic lane a good view is had of cars ahead and the signal will be thus very conspicuous and very easily seen.

It will, of course, be understood that various changes may be made in the form, details, arrangements and proportions of the parts, without departing from the scope of applicant's invention, which generally stated, consists in a device capable of carrying out the objects above set forth, in the parts and combinations of parts disclosed and defined in the appended claim.

What is claimed is:

A turn and stop signal for an automobile having in combination, an elongated tube of small diameter, pointed separate members formed of tubes of substantially the same diameter disposed in the same vertical plane as and at either end of said elongated tube and pointing away from said tube respectively, said tubes being of the type used in neon signs and having electrodes therein and adapted to be illuminated in the operation of said signal, a guard member formed of a tube of small diameter extending around said tube and members and over the same at a small distance therefrom and disposed in the same vertical plane as said tube and members, said guard member having its ends secured to the top of said automobile, said tube, members and guard member forming an openwork structure, the parts of which are of small transverse dimension, whereby snow cannot become disposed against said structure and obscure said signal and whereby said signal is easily visible from the front and rear of said automobile at either side thereof, and members supporting said first mentioned tube and members from said guard.

WALTER L. WESTLUND.